United States Patent [19]

Dillinger

[11] 4,113,405
[45] Sep. 12, 1978

[54] APPARATUS FOR DRILLING OR REAMING

[76] Inventor: Lester L. Dillinger, 1569 W. 17th St., Long Beach, Calif. 90813

[21] Appl. No.: 822,790

[22] Filed: Aug. 8, 1977

[51] Int. Cl.² .................... B23B 31/44; B23B 27/10
[52] U.S. Cl. .................................... 408/226; 408/57
[58] Field of Search .................. 408/57, 59, 56, 226

[56] References Cited

U.S. PATENT DOCUMENTS

| 2,933,321 | 4/1960 | Cascone | 408/57 |
| 3,647,310 | 3/1972 | Morse | 408/239 |

FOREIGN PATENT DOCUMENTS

| 434,703 | 9/1935 | United Kingdom | 408/226 |

Primary Examiner—Harrison L. Hinson

[57] ABSTRACT

A hollow drive shaft, to one end of which a cutterhead is threadedly attached for longitudinal and rotational movement as the shaft is moved through a pipe to be reamed. Passages are provided in the cutterhead for transmission of fluid in the hollow shaft to the exterior of the cutterhead for cooling and removal of drilled or reamed material. The outer periphery of the drive shaft may be provided with a rectangular (square) configuration. The end of the shaft adjacent the cutterhead may receive a cap including a sleeve portion and a flange portion which fits over the end of the drive shaft; the flange may thus be interposed between the drive shaft end face and a shoulder on the cutterhead. The cap fits closely against the periphery of the drive shaft in order to transmit deformation forces from the cutter to the shaft across a wide area of the shaft periphery.

7 Claims, 3 Drawing Figures

APPARATUS FOR DRILLING OR REAMING

BACKGROUND OF THE INVENTION

A wide variety of machines have been developed and disclosed which may be utilized to ream or drill out the residue deposited in heat exchanger and similar tubing. In many of those machines, a cutterhead may be threadedly mounted on the end of a drive shaft. Thus, as the drive shaft is rotated about its axis and moved longitudinal along its axis, the cutterhead may be driven through a tube to ream out any undersirable deposits and/or to enlarge the inner diameter of the tube.

An example of such a machine has been illustrated in my U.S. Pat. No. 4,015,304, issued Apr. 5, 1977. As taught in that patent, hydraulic flushing during the reaming operation may be accomplished by discharging fluid under pressure through the cutterhead in the area of the cutting. Consequently, the fluid will cool the cutterhead as well as flush away the waste material.

In order to accomplish this, the drive shaft has been provided with a hollow passage extending along the axis thereof. At one end of the drive shaft, a female threaded section may be formed in the wall of the passage. The cutterhead may be provided with a threaded end or stud which can be turned into the thread in the passage of the drive shaft in order to operatively connect the cutterhead to the drive shaft. The cutterhead may be provided with one or more passages which extend through the stud and communicate with the passage of the drive shaft. The cutterhead passages may extend to the surface of the cutterhead in the vicinity of the cutting edges. Thus, as fluid is moved under pressure through the drive shaft, it will be forced through the cutterhead openings in the vicinity of the cutting operation.

In the prior art devices, as the drive shaft is moved in rotational and longitudinal motion, significant torque and torsional forces are exerted on the cutterhead and, therefore, are transmitted into the drive shaft. For example, near the end of the threaded stud of the cutterhead, a shoulder may be formed for abutment with the end face of the drive shaft. As the cutting operation takes place, reaction forces generated by the cutting are transmitted through the cutterhead back to the drive shaft. Since the drive shaft has already been weakened at the threaded portion thereof, i.e., it has a thinner wall at the threaded portion than further along the axis, those reaction forces will tend to deform the drive shaft. For example, such deformation may cause a "flanging" of the end of the drive shaft such that the latter tends to expand around the end.

Flanging and weakening of the drive shaft may also cause a split to occur in the wall of the shaft extending from the end and generally parallel to the shaft axis. In other words, reaction of the cutterhead against the work piece will tend to cause the cutterhead to move to a position in which its axis intersects the axis of the drive shaft obliquely, rather than be located so as to be co-axial therewith. This movement causes a deformation in the drive shaft, resulting not only in destruction of the shaft, but also in damage to the work piece.

Accordingly, it has become necessary to devise structure which may be simply and inexpensive employed to prevent such damage without requiring a total redesign of available machinery.

SUMMARY OF THE INVENTION

The present invention relates to structure for improving the structural relationship of a cutter and drive shaft in order to dissipate reaction forces delivered to the shaft by the cutter across as wide an area as possible. It is intended that the invention minimize the possibility of damage to the end of the drive shaft by such forces.

More specifically, the invention relates to an end cap which may be installed on the drive shaft in close fitting relationship thereto. The end cap may comprise a sleeve or bushing section which extends along the outer periphery of the shaft. Preferably, the sleeve fits into close relationship with the periphery of the shaft so that any bending moments imposed upon the shaft by the sleeve are, insofar as possible, dissipated across a surface area rather than a line of contact.

In the presently preferred embodiment, the drive shaft may be provided so as to have a substantially rectangular (e.g., square) configuration and the longitudinal bore in the cap may be provided with a similar wall configuration. Preferably, the sharp corners of the drive shaft and the cap bore may be chamfered in order to minimize stresses which might otherwise occur at those locations.

At one end of the cap, a washer-like flange may be provided so as to extend radially inwardly toward the cap axis. When the cap is installed over the end of the drive shaft, the flange may be positioned in surface-to-surface abutment with the end face or wall of the shaft. Similarly, when the cutterhead is threaded into the drive shaft, a shoulder formed adjacent the threaded stud of the cutterhead will frictionally engage the flange portion of the cap. Consequently, as the drive shaft is rotated about its axis and driven through a tube or other structure to be reamed, the cutterhead will engage the material to be removed and will impose reaction forces on the drive shaft and the cap.

The presently preferred configuration of the end cap results in substantially uniform distribution of unevenly applied axial forces across the end face of the hollow drive shaft. Since the end cap is relatively small, it can be inexpensively produced from a relatively high strength material to cause the axial forces to be distributed over a wider area of the drive shaft end face than would be the case if the cutterhead shoulder abutted the end face directly.

As the drive shaft and cutterhead revolve during the reaming operation, torque will be imposed upon the cap due to the frictional engagement of the cutterhead shoulder and the flange. Such torque will be distributed through the sleeve portion of the cap across a relatively large surface of the periphery of the drive shaft. Consequently, such torque will thus be prevented from exerting a bending moment on the joint of the drive shaft and cutterhead large enough to cause the normally co-axial axes to intersect at an oblique angle. In other words, the threaded stud will be prevented from exerting a bending moment on the end of the drive shaft sufficient to deform the latter into a flange which, in the past, has often resulted in splitting of the shaft. This, of course, is a very important advantage since the internal threading of the end of the drive shaft results in a reduced wall thickness at that point, i.e., at the location where the bending resistance needs to be greatest.

In many instances, the hollow drive shaft may be communicated with internal passages in the cutterhead through which cooling and flushing fluids may be driven. It should be noted that the present invention also results in a strengthening of the drive shaft such that any "water hammer" effect which might occur at the threaded joint may thus be absorbed in the end cap without damage to the drive shaft or cutterhead.

Consequently, the present invention results in a novel and extremely simple and inexpensive structure to strengthen and vastly increase the life of drive shafts of this type. Upon reading the following detailed description, taken together with the accompanying drawing, those skilled in the art will realize that the invention may be employed in a wide variety of structures in addition to the preferred embodiment which will now be described.

DETAILED DESCRIPTION

Figure 1:
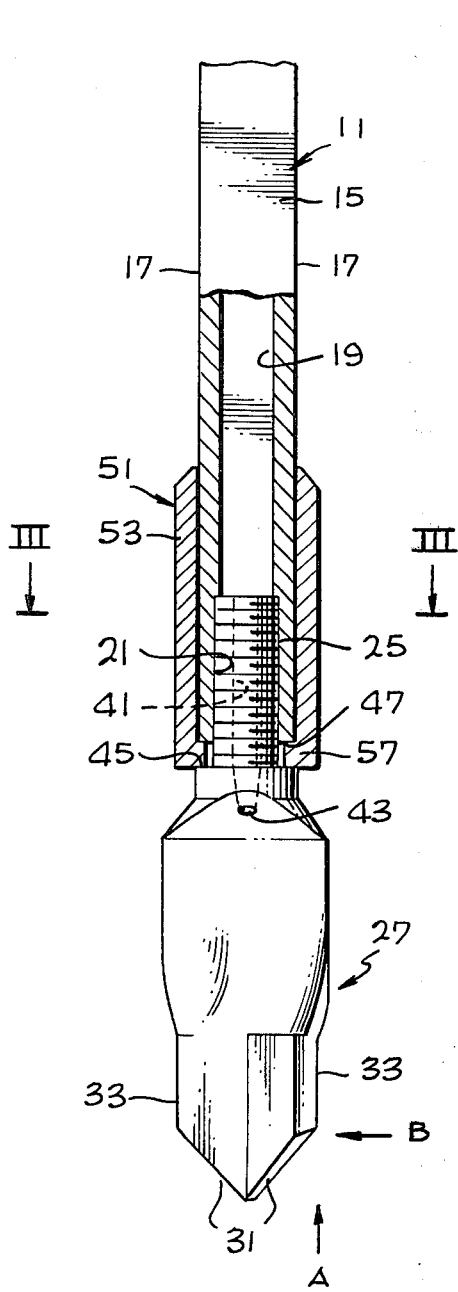
FIG. 1 comprises an axial view, partly in section, of a drive shaft and cutterhead, illustrating the manner in which strengthening structure formed in accordance with the present invention may be installed.
Figure 3:
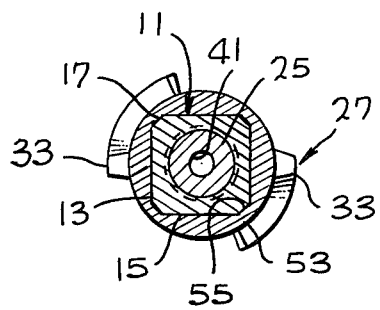
FIG. 3 comprises a sectional view of the structure illustrated in FIG. 1, as seen along the line III—III thereof.
Figure 2:
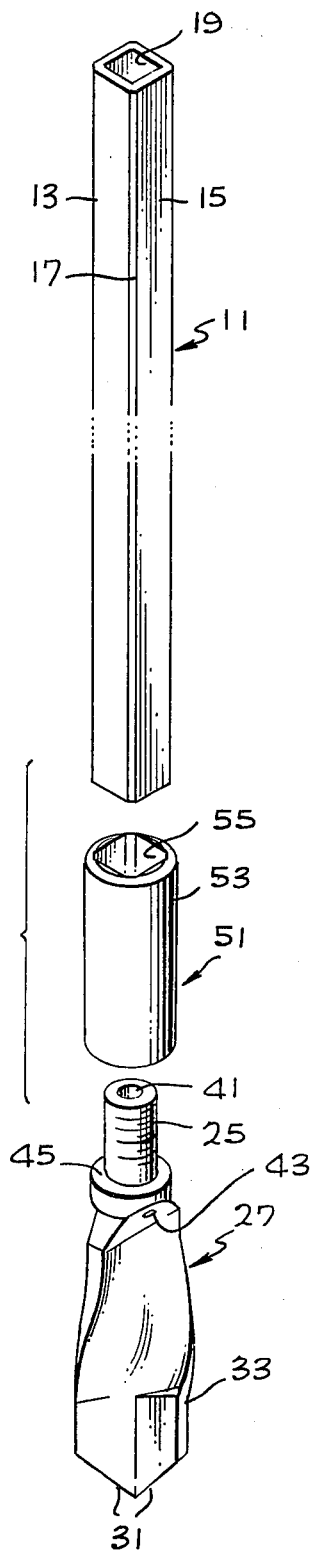
FIG. 2 comprises an exploded view of the structure illustrated in FIG. 1.

As shown in FIG. 1, a drive shaft 11 may be provided having an exterior peripheral configuration which, preferably, may be rectangular in form. In fact, the preferred rectangular configuration may be square, having four faces, two of which are illustrated at 13 and 15, preferably separated by relatively small chamfer surfaces 17, e.g., for removal of shaft corners. Such chamfering will minimize stresses generated during shaft rotation.

Preferably, the drive shaft 11 may be provided with a central, co-axial passage 19 which may be of any suitable configuration, whether square, round etc. Adjacent one end of the passage 19, a female thread 21 may be provided in order to receive the threaded stud 25 of a cutterhead 27. The cutterhead, which may be of any suitable configuration, is shown in this embodiment to comprise a pair of end cutting edge 31 and a pair of side cutting edges 33.

As can be seen in FIG. 1, an axial passage 41 may be provided within the stud section 25 of the cutterhead. Passage 41 may open, at its upper end in the drawing, into communication with the passage 19 of drive shaft and, at the opposite end, in one or more openings 43. Thus, cooling and flushing fluid may be delivered to the vicinity of the cutterhead 27 through the connected passages 19 and 41.

Adjacent to the stud 25 of the cutterhead 27, there may be provided a shoulder 45 which, in prior art application, would abut the end face 47 of the drive shaft when the cutterhead and shaft were completely screwed together.

In accordance with the present invention, an end cap 51 may be installed over the end of the drive shaft 11. The end cap may comprise a sleeve portion 53 having an internal bore 55 which closely conforms to the outer periphery of the drive shaft 11. At one end of the end cap, a radial flange 57 may be provided which extends into and partially closes one end of the bore 55. Thus, the cap 51 may be slid over the end of the drive shaft or rod 11 until the washer-like flange 57 abuts the end face 47 of the drive shaft. Subsequently, the stud portion 25 of the cutterhead 27 may be passed through the flange 57 and threaded into the end of the drive shaft. The cutterhead may be turned sufficiently so that the shoulder 45 and the end face 47 are located in frictional, surface-to-surface engagement with the exterior and interior surfaces of the flange, respectively.

The sleeve portion 53 of the cap may be of any suitable axial dimension. However, it is presently preferred that sleeve 53 extends somewhat beyond the bottom of the threaded section 21 of the shaft.

In using devices formed according to the present invention, those skilled in the art will realize that the two major components of deformation force which may be exerted as reaction forces on the cutterhead 27 are such as illustrated at A and B in FIG. 1. The axially directed forces, offset from the axis of the cutter and shaft as illustrated at A, would, in the prior art devices, drive the shoulder 45 against the end face 47 of the drive shaft. Such forces if large enough, would often cause a weakening of the end face and force it to "flange" radially outwardly.

When the radially directed reaction force components illustrated at B were exerted on prior art devices, the likelihood of flanging of the end of the drive shaft increased drastically since, effectively, a lever-like force was exerted on the end of the drive shaft, considering the inner end of the stud section 25 to constitute the fulcrum point. Since the end of the drive shaft is already weakened, slightly, as a result of the tapping of threaded section 21, this flanging effect resulted in a further thinning and weakening of the end of the drive shaft, eventually causing the latter to crack. Such cracks often occur in a direction generally parallel to the drive shaft axis. Consequently, the cutterhead was allowed to assume an oblique orientation, relative to the drive shaft axis. Damage to the tubing being worked on was almost sure to result unless all power to the drive shaft could be shut off immediately.

Utilizing a device formed in accordance with the present invention, however, axially directed forces such as A cannot be imposed directly upon a portion of the drive shaft. In other words, such reaction forces cannot be exerted almost entirely against one side of the drive shaft, considered at any given instant of rotation. Instead, the flange portion 57 of the cap 51 causes a redistribution of such axially directed forces throughout the end face of the drive shaft.

While some portion of the offset axially directed forces may still be concentrated to one side of the drive shaft axis, the flange 57 may cause a substantial redistribution of those forces. Since the flange may be integral with and perpendicular to the sleeve portion 53, and since the sleeve portion 53 may be in close sliding relationship with the outer periphery of the drive shaft, the end of the sleeve distal from the flange will prevent bending. The axially directed forces imposed on the flange will not only be distributed across the end face 47 of the drive shaft, but may also be dissipated, to some extent, on the peripheral surface of the drive shaft by the sleeve.

With respect to radially directed forces, as illustrated at B, it can be seen that the sleeve 53 will strongly resist such bending forces. Since the distal end of the sleeve is preferably located beyond the inner end of the tapped portion 21 of the drive shaft, such bending moments can be absorbed across a wide surface area of the drive shaft and the possibility of damaging the end of the drive shaft, as often occurred in the prior art, is substantially totally eliminated.

Having now reviewed this description and the accompanying drawing, those skilled in the art will realize that this preferred embodiment of the present invention is merely exemplary and that a wide variety of additional embodiments, many of which may not even resemble that depicted here, may be employed. Nevertheless, such embodiments will utilize the invention in its technique and spirit, as defined in the following claims.

What is claimed is:

1. Apparatus for reaming comprising
    a hollow drive shaft adapted to be reciprocatably driven along its longitudinal axis and rotatably driven about its longitudinal axis and having
        a female threaded section adjacent one end thereof and co-axial with said longitudinal axis;
    a cutterhead including
        a cutting edge adjacent one end thereof,
        a male threaded portion at the opposite end thereof threadable into said female threaded section of said drive shaft, and
        shoulder means intermediate the ends of said cutterhead and oriented substantially perpendicular to the axis thereof, and
    cap means removably mounted on said drive shaft adjacent said female threaded section and in frictional engagement with said shoulder means.

2. The apparatus of claim 1 wherein
    said cap means comprises
        a sleeve portion in close relation to the periphery of said drive shaft and
        a flange portion integral with said sleeve portion and in surface-to-surface abutment with said end of said drive shaft adjacent said female threaded section and with said shoulder.

3. The apparatus of claim 2 wherein the external periphery of said drive shaft and the internal wall of said sleeve portion are complementary, generally rectangular configurations in close fitting relationship.

4. The apparatus of claim 2 wherein
    said flange portion extends radially inwardly from the outer periphery of said drive shaft.

5. Apparatus for preventing flanging and splitting of a drive shaft upon which torsion and torque are imposed by a cutterhead threadedly attached to said drive shaft comprising
    a cap member having
        a sleeve portion including
            an inner wall sized and shaped so as to fit in close relationship with said drive shaft and
        a flange portion extending radially inwardly from said sleeve portion inner wall in substantially perpendicular relationship with said sleeve portion, said flange portion located intermediate an end of said drive shaft and said cutterhead.

6. Apparatus for reaming a tube comprising
    a drive shaft adapted for longitudinal and rotational motion about the axis thereof and including
        a first threaded portion adjacent one end thereof and
        an outer periphery of generally rectangular configuration,
    a cutterhead including
        a second threaded portion for cooperable connection with said first threaded portion on said drive shaft, and
    cap means for prohibiting deformation of said one end of said drive shaft including
        sleeve means fitting in close relationship with said drive shaft and
        means for transmitting deformation forces generated by said cutterhead over a substantial portion of said sleeve means for distribution of such forces across a relatively large surface area of the periphery of said drive shaft.

7. The apparatus of claim 6 wherein
    said drive shaft and said cutterhead include
        passage means for transmitting fluid to the external surfaces of said cutterhead.

* * * * *